United States Patent [19]
Olah

[11] 3,764,026
[45] Oct. 9, 1973

[54] MATERIAL TRANSFER MECHANISM
[75] Inventor: Emmerich I. Olah, Phoenix, Ariz.
[73] Assignee: Interlake, Inc., Chicago, Ill.
[22] Filed: Sept. 20, 1971
[21] Appl. No.: 181,879

[52] U.S. Cl. ............... 214/35 R, 105/280, 141/232, 141/272, 141/284, 202/262, 214/18 PH
[51] Int. Cl. ............................................. B66c 17/08
[58] Field of Search ..................... 214/18 PH, 35 R; 202/262, 263; 141/231, 232, 233, 272, 284; 105/280

[56] References Cited
UNITED STATES PATENTS
1,363,008  12/1920  Pavitt ................................ 214/35 R
2,075,931  4/1937   Eades ................................. 141/232

*Primary Examiner*—Gerald M. Forlenza
*Assistant Examiner*—George F. Abraham
*Attorney*—Prangley, Dithmar, Vogel, Sanler & Stotland

[57] ABSTRACT

The transfer mechanism finds particular use in transferring coal from the hoppers of a charging-car into coal-carburizing ovens. The mechanism has a chute mounted adjacent to the outlet of the hopper so as to be movable to a discharge position wherein the chute is aligned with the outlet of the hopper and the inlet of the oven; and to a storage position. The chute includes at least two telescoping sections which are movable between retracted and extended conditions. There is provided an actuating mechanism coupled to the chute and operable to move the chute to the discharge position thereof followed by placing the telescoping sections in their extended condition so as to engage in the inlet of the oven; the actuating mechanism is also operable to retract the telescoping sections and then move the chute to its storage position.

30 Claims, 13 Drawing Figures

Patented Oct. 9, 1973

INVENTOR
EMMERICH I. OLAH

BY
Prangley, Clayton, Mullin,
Dithmar & Vogel ATTYS.

Patented Oct. 9, 1973

3,764,026

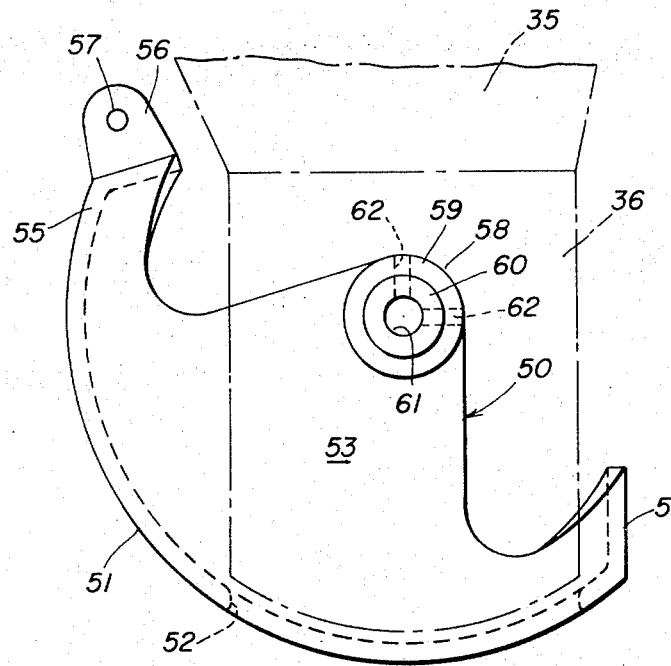
FIG. 4
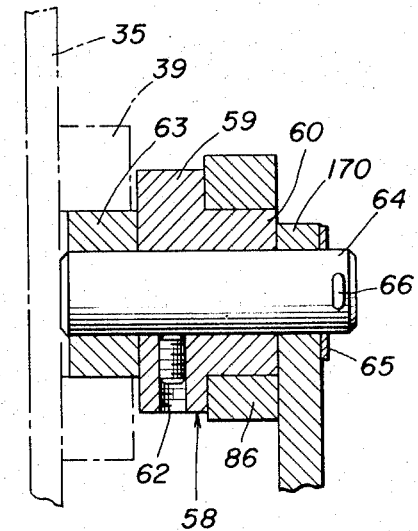
FIG. 6
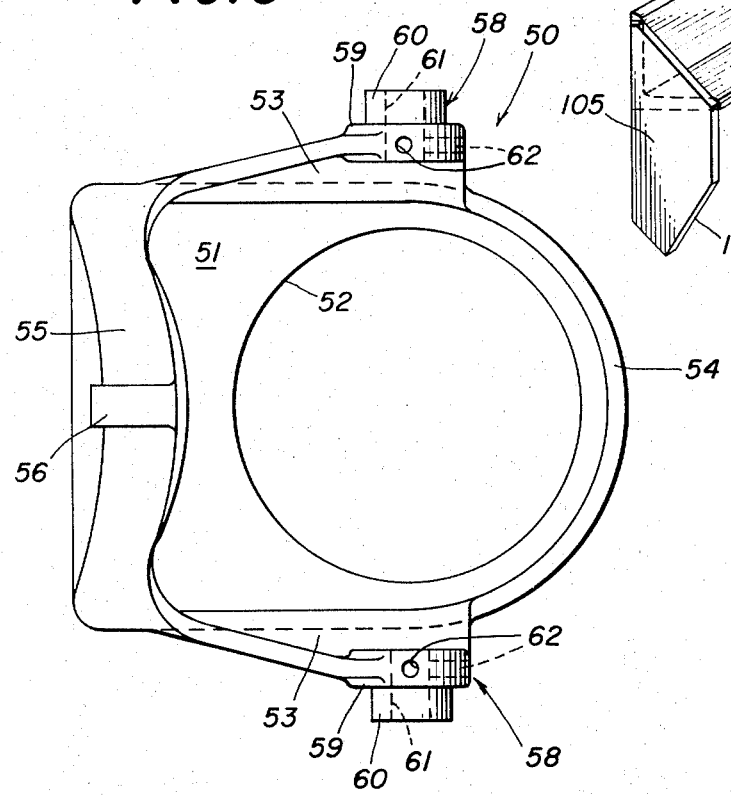
FIG. 5
FIG. 7

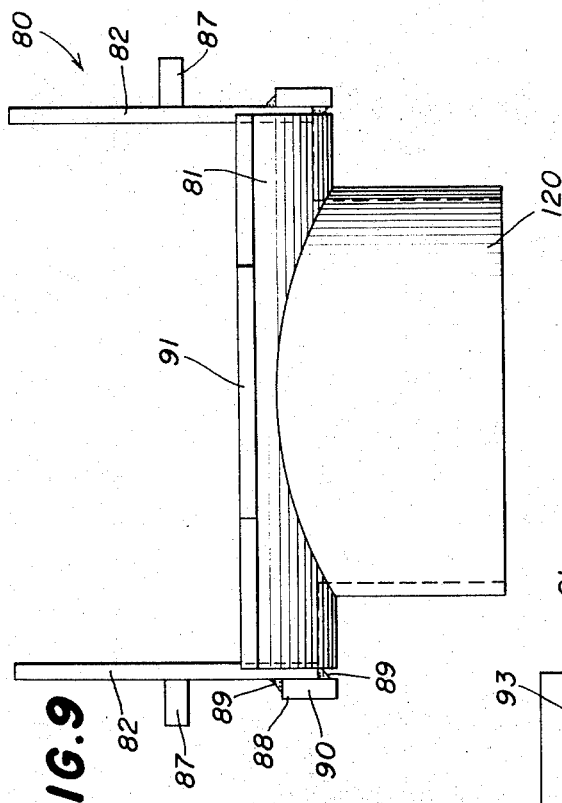
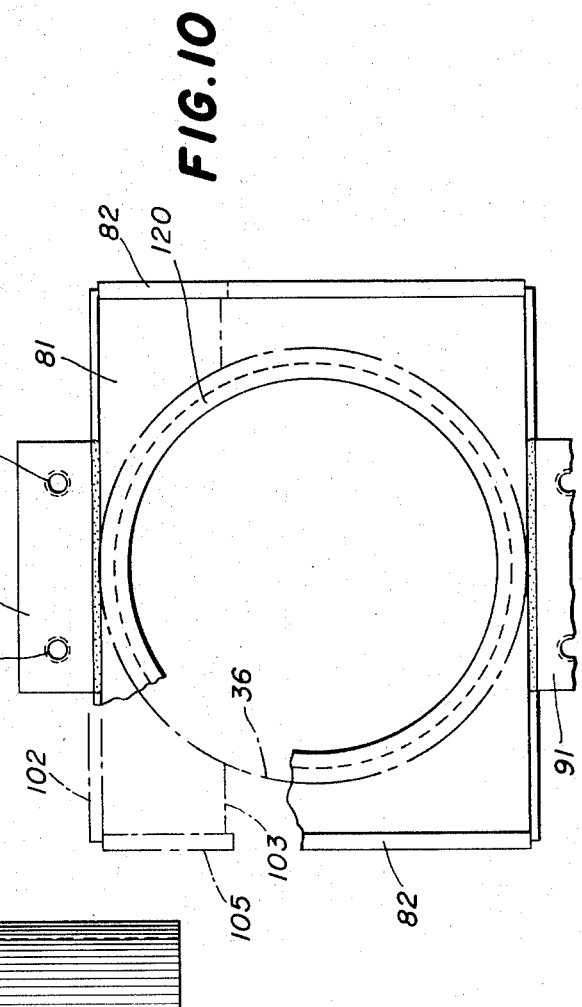
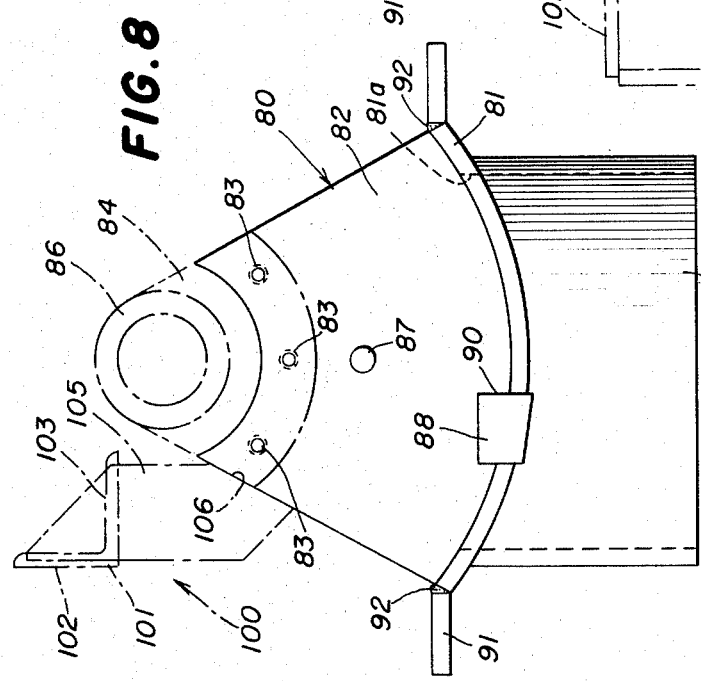

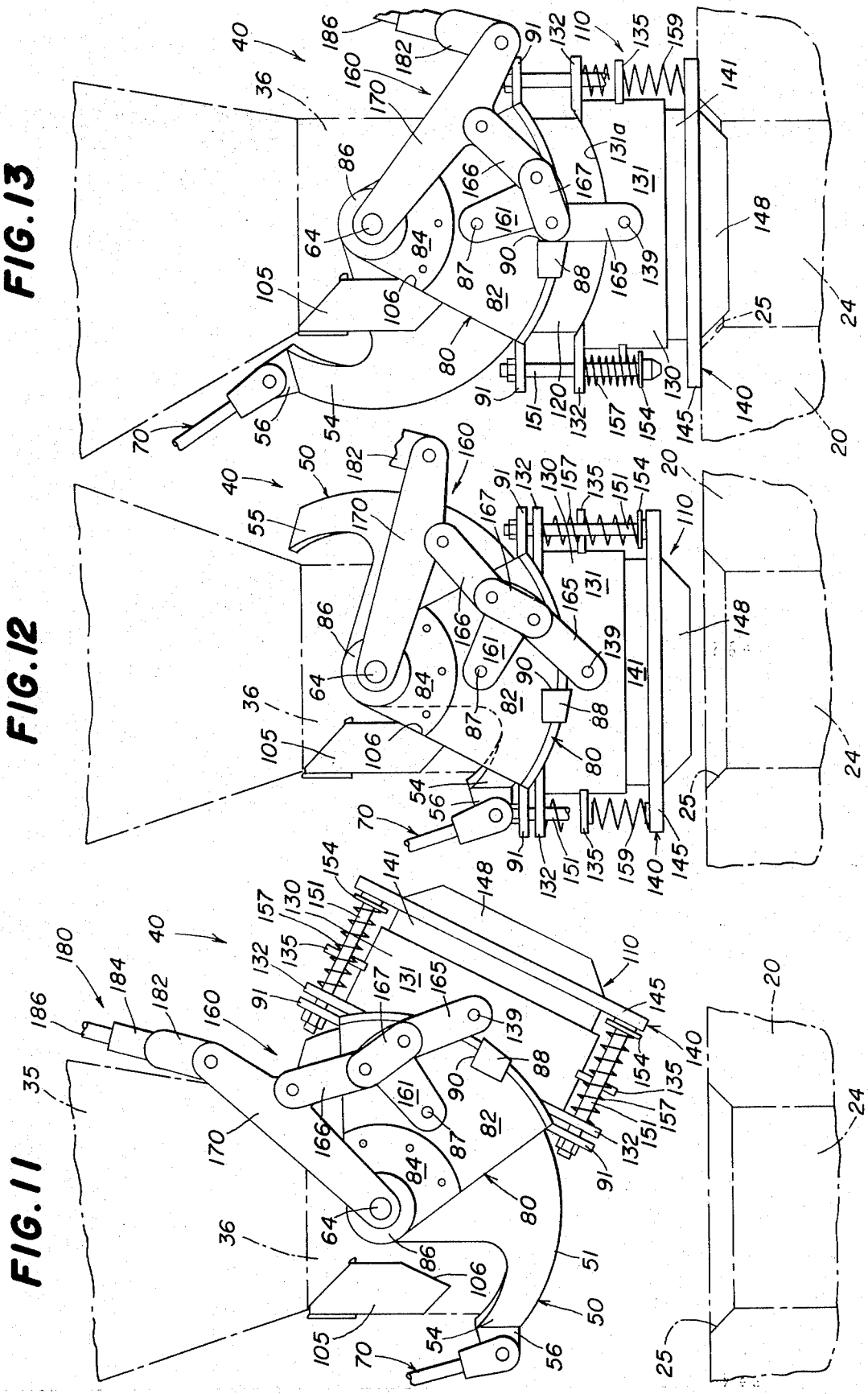

MATERIAL TRANSFER MECHANISM

This invention relates to a material transfer mechanism which is capable of transferring materials such as coal from a source thereof such as a railway or special charging car to a device which utilizes the material, for example, a coal-carburizing oven.

It is an important object of the present invention to provide a material transfer mechanism which can be secured to the spout of a hopper on a railway or special charging car, which mechanism is capable of selectively delivering material from the car into a utilization means, such as a coal-carburizing oven.

Another object of the invention is to provide a mechanism for transferring coal from a railway or special charging car into a coal-carburizing oven and at the same time prevent emission of pollutants, and also the fumes and flame during the charging operation of the oven.

Yet another object is to provide a material transfer mechanism which delivers all of the coal into the oven while eliminating spillage onto the surrounding area.

Still another object of the invention is to provide a material transfer mechanism which includes a chute that is pivotal between a storage position and a discharge position, in which discharge position, the chute is aligned with the outlet of the hopper and with the inlet of the oven.

In connection with the foregoing object, it is another object to provide the chute with telescoping sections which can be placed in a retracted position when not in use and in an extended position into engagement with the inlet of the oven when it is desired to charge the oven.

In connection with the foregoing two objects, it is another object to provide an actuating mechanism coupled to the chute and operative both to pivot the chute between its storage and discharge positions and to move the telescoping sections between retracted and extended positions.

A further object is to provide an actuating mechanism which automatically sequentially moves the chute from its storage position to its discharge position and then extends the telescoping sections into engagement with the inlet of the oven.

A yet further object is to provide the telescoping sections with means to enable the telescoping sections to land "softly" on the oven thereby minimizing the chances of damage thereto.

A still further object is to provide a material transfer mechanism which is pivotal or swingable to an out of the way position to enable the charging car to move uninhibited, and to enable an apparatus for automatically covering the inlet to the oven to be utilized without interfering with the movement of either the material transfer mechanism or the charging car.

Another object of the invention is to provide a material transfer mechanism which is compact, yet easily serviceable and adaptable to hoppers or a particular railway or special charging car.

Yet another object is to provide a material transfer mechanism which includes a chute having telescoping sections, and a single auxiliary drive for swinging the chute into and out of alignment with the inlet of the oven; and extending and retracting the telescoping sections by a continuous stroke of the auxiliary drive.

Still another object is to provide the chute of the material transfer mechanism with telescoping sections which engage in the inlet of the oven and seal thereagainst to prevent spillage of the coal to the adjacent area and prevent pollutants and other undesirable by-products such as fumes and flames from being emitted into the atmosphere.

In summary, there is provided a material transfer mechanism for transferring material from a source thereof to a utilization means for the material, the material transfer mechanism comprising a chute movably mounted adjacent to the outlet of the source and movable between discharge and storage positions, the chute in the discharge position thereof being aligned with the outlet of the source and the inlet of the utilization means, the chute in the storage position thereof being out of alignment with the outlet of the source and the inlet of the utilization means, the chute including at least two telescoping sections movable with respect to each other between retracted and extended positions, and an actuating mechanism coupled to the chute and operable to move the chute to the discharge position thereof followed by placing the telescoping sections in the extended condition thereof into engagement with the inlet of the utilization means, the actuating mechanism being operable to place the telescoping sections in the retracted condition thereof followed by moving the chute to the storage position thereof.

Also, there may be provided in the transfer mechanism a gate movably mounted adjacent to the outlet of the source of material and movable between open and closed position with respect to the inlet.

With the foregoing and other objects in view which will apear as the description proceeds, the invention consists of certain novel features of construction, arrangement and a combination of parts hereinafter fully described, illustrated in the accompanying drawings, and particularly pointed out in the appended claims, it being understood that various changes in form, proportion, size, and minor details of the structure may be made without departing from the spirit or sacrificing any of the advantages of the invention.

For the purpose of facilitating an understanding of the invention, there is illustrated in the accompanying drawings a preferred embodiment thereof, from an inspection of which, when considered in connection with the following description, the invention, its mode of construction, assembly and operation, and many of its advantages should be readily understood and appreciated.

FIG. 4 illustrates a side elevational view on a smaller scale of the gate and its orientation with respect to the hopper spout which is shown in phantom;

FIG. 5 is a top plan view of the gate shown in FIG. 4;

FIG. 6 is a cross-sectional view on an enlarged scale taken along the line 6—6 of FIG. 3;

FIG. 7 is a perspective view of the abutment assembly which limits movement of the chute;

FIG. 8 is a side elevational view of the chute carrier and the inner telescoping section carried thereby, the abutment assembly being shown in phantom;

FIG. 9 is a front elevational view of the chute carrier and inner telescoping section of FIG. 8;

FIG. 10 is a bottom plan view of the chute carrier and inner telescoping section of FIG. 8;

FIG. 11 is a partially-schematic view of the material transfer mechanism with the chute pivoted to its storage position and with the telescoping positions retracted;

FIG. 12 is a partially-schematic view of the material transfer mechanism with the chute in its discharge position, that is, aligned with the outlet of the hopper and with the inlet of the oven, but with the telescoping sections retracted; and FIG. 13 is a partially-schematic view of the material transfer mechanism with the chute in its discharge position, the telescoping sections extended, and the gate open.

Figure 1:
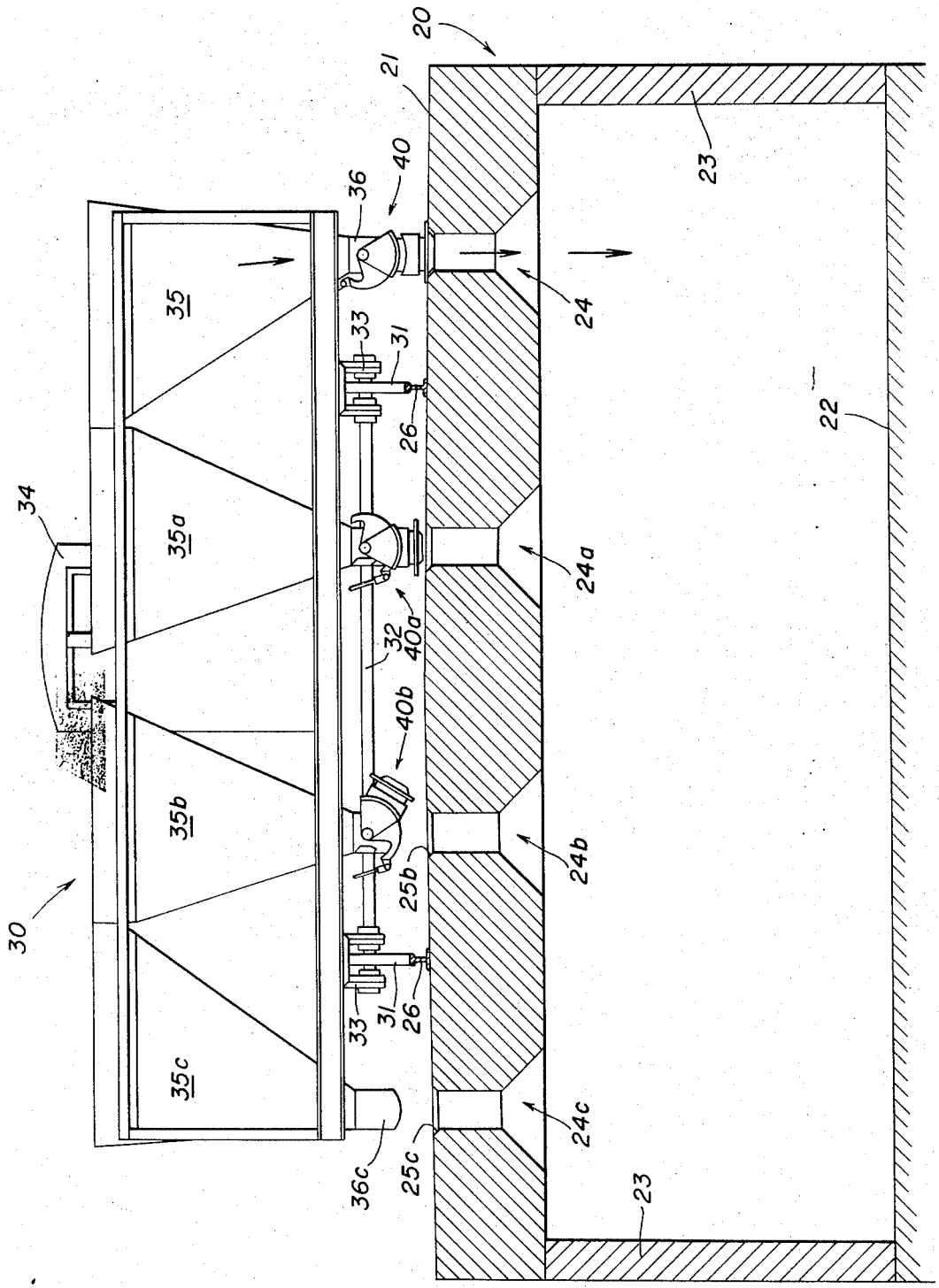
FIG. 1 illustrates a coal-carburizing oven and a special charging car disposed thereon, there being provided four material transfer mechanisms on the charging car at various positions and each incorporating the features of the present invention.

Referring now to the drawings, and more particularly to FIG. 1 thereof, there is shown an oven 20 having a top 21 and a floor 22, which are usually constructed of brick. There are also provided doors 23 to gain access to the interior of the oven 20. Formed in the top 21 is a set of four inlets 24, 24a, 24b, and 24c, each having a flared lower portion and a slightly flared exterior portion, respectively 25, 25a, 25b, and 25c. Normally during operation of the oven 20, the inlets 24-24c are closed to prevent pollutants, fumes, and the flame itself from escaping into the atmosphere. The mechanism for effecting closure of the inlets is not shown. Disposed on the outer surface of the top 21 is a pair of longitudinally extending and laterally spaced-apart rails 26 which are for the purpose of carrying a special charging car 30.

The special charging car 30 includes two pair of wheels 31 carried by axles 32 and operated by a driving mechanism 33, the wheels 31 being laterally spaced apart to ride on the rails 26. The charging car 30 further includes a cab 34 within which an operator is located to operate the car 30 and to operate the material transfer mechanisms to be described hereinafter. The charging car 30 also includes a set of four hoppers 35, 35a, 35b, and 35c, each having a spout 36–36c associated therewith. Each spout 36–36c is circular in transverse cross section and has a convex outline 37 (See FIG. 2) at its extremity when viewed in side elevation, but has a concave outline 38 at its extremity when viewed in front elevation (See FIG. 3). In the particular example shown in FIG. 1, the hoppers 35–35c are adapted to be filled with coal, although the material transfer mechanism may be used with other types of material.

There is also provided in association with each spout 36–36c, a material transfer mechanism 40, 40a, and 40b. It is to be understood that a fourth transfer mechanism would be associated with the spout 36c, but has not been shown thereon to depict the spout 36c. The material transfer mechanism 40b is in the storage position thereof and the hopper 35b is closed. The material transfer mechanism 40a is in the discharge position thereof, that is, the chute is aligned with the inlet 24a of the oven 20, but the hopper 35a is still closed. The material transfer mechanism 40 is in the discharge position thereof, and the telescoping sections are in the extended position thereof into engagement with the inlet 24, and the gate 50 is open so that the coal or other material in the hopper 35 can gravitate through the material transfer mechanism 40 into the oven 20. Thus, each material transfer mechanism has a gate to selectively open and close the outlet of the hopper 35, and a chute which is movable from a discharge position as is shown by the mechanisms 40 and 40a and a storage position as shown by the mechanism 40b. Each chute has telescoping sections engageable in the inlet of the oven 20, which is the condition of the mechanism 40 and a retracted position which is the condition of the mechanisms 40a and 40b.

Turning now to FIGS. 2 to 5, the details of construction of the material transfer mechanism 40 will be described. There is provided a gate 50 having a closure wall 51 which is generally part cylindrical in shape, having an extent in the embodiment shown on the order of 100°. There is formed in the closure wall 51 an opening 52 which is circular when viewed in plan (See FIG. 5), the diameter of the opening 52 when measured in plan being approximately equal to the diameter of the spout 36 on the hopper 35. Thus, when the gate 50 is in the position shown in FIG. 4, the opening 52 is in vertical alignment with the spout 36 and the gate 50 is "opened" to enable material in the hopper 35 to gravitate out. The gate 50 has a pair of side walls 53 which flare outwardly from the closure wall 51, as is more clearly shown in FIG. 4. The side walls 53 are generally triangularly shaped and merge into a pair of arch-shaped walls 54 and 55. There is provided an ear 56 on the arch-shaped wall 54 approximately centrally thereon, the ear 56 having an opening 57 extending therethrough. Each wall 53 carries thereon a bearing 58 defined by a larger diameter head portion 59 and a smaller diameter neck portion 60 which is carried by the head portion 59 and disposed outwardly thereof. A bore 61 extends through the bearing 58, which bore communicates with a pair of transversely formed threaded openings 62 in the head portion 59. These threaded openings 62 accommodate set screws, as will hereinafter be described.

Disposed at diametrically opposite points on the interior of the spout 36 respectively are recesses, each carrying a journal 39 with a bushing 63 (See FIG. 6) thereon. A pivot pin 66 passes through the bearing 58 on one side of the gate 50 and through one of the bushings 63, a set screw 67 being threaded in the opening 62 and engaging the pin 66. A link 170 is also carried by the pivot pin 64, as will be explained hereinafter. A washer 65 and a cotter pin 66, passing through an appropriately shaped hole in the pivot pin 64, securely hold one side of the gate 50 in place. A similar arrangement on the other side of the gate is provided thereby pivotally to mount the gate 50 on the spout 36.

The gate 50 is pivotal between an open condition, as shown in FIG. 4, wherein the opening 52 in the gate 50 is vertically aligned with the spout 36, and a closed position wherein the gate 50 is pivoted counterclockwise, such that the arch-shaped wall 55 moves downwardly and the arch-shaped wall 54 moves upwardly until the portion of the closure wall 51 without the opening 52 therein is immediately beneath the spout 36, thereby closing the same.

To move the gate 50 between its open and closed positions, there is provided a gate drive mechanism 70, which mechanism includes a U-shaped bracket 71 that receives between the legs thereof the ear 56. A bolt 72 passes through suitably shaped openings in the bracket 71 and the opening 57 in the ear 56. Finally, a washer 73 on the bolt 72 and a cotter pin 74 passing through the bolt 72 hold the bracket 71 in place. There is provided a rod 75 having a threaded end 76 with a bolt 77 threaded thereon. A further nut (not shown) threadedly engages the threaded end 76 on the other side of the bight joining the two arms of the bracket 71, thereby to secure the rod 75 to the bracket 71. The rod 75 is connected to a drive mechanism which functions to pull when it is desired to open the gate, that is, pivot the gate 50 clockwise; and pushes when it is desired to close the gate 50, that is, pivot the gate 50 counterclockwise.

The material transfer mechanism 40 further comprises a chute carrier 80 which chute carrier carries the chute assembly 110. The details of construction of the chute carrier 80 may be seen in FIGS. 2, 3, and 8–10. The chute carrier 80 includes a part cylindrical bottom wall 81 having an extent, in the form shown, of about 55°. There is formed in the wall 81 an opening 81a which is circular when viewed in plan view. Mounted on the ends of the bottom wall 81 respectively are upstanding plates 82, each plate 82 being in the shape of a section of a circular segment. Near the end of each plate 82 farthest from the wall 81 is a set of three threaded holes 83. The chute carrier 80 also includes a pair of plates 84, each of these also being in the shape of a section of a segment of a circle, but shorter in height than the height of the plates 82. Each plate 84 also has holes therein which align with the holes 83 so as to receive bolts 85 there-through and into engagement with the threaded openings 83, thereby to secure the plates 82 and 84 together on each side. Fixedly secured in the outer part-circular end of the plate 84 is a bearing 86, the inner diameter of which substantially matches the outer diameter of the neck portion 60 of the bearing 58. Referring specifically to FIG. 6, the bearing 86 on one of the plates 84 is mounted as shown, and the bearing 86 on the other side is mounted in a similar fashion, thereby pivotally to mount the chute carrier 80. Disposed on each plate 82 approximately centrally thereon and protruding outwardly therefrom is a stud 87. Adjacent to the bottom of each plate 82, slightly to the left of center, as viewed in FIG. 8, is a stop 88 welded at 89 to the associated plate 82. The stop 88 has an abutment surface 90 which is generally parallel to the line about which the plate 82 is symmetrical. There is also provided a pair of flanges 91 respectively welded, as at 92, to the edges of the bottom wall 81, in alignment with each other and substantially normal to the plane of the surface 90. Disposed in each flange 91 is a pair of spaced-apart holes 93.

Figure 2:
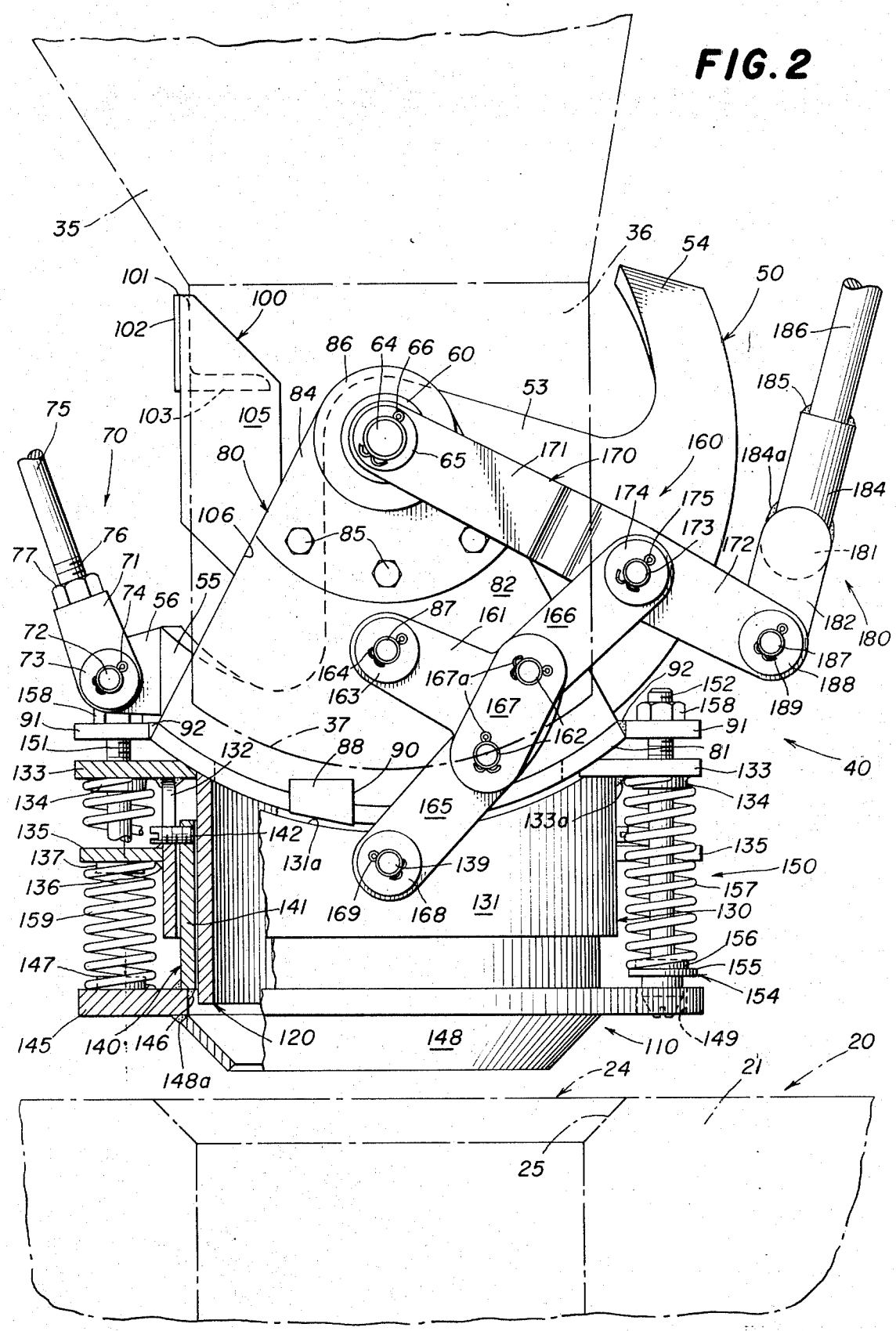
FIG. 2 illustrates on an enlarged scale the material transfer mechanism in side elevational view, the hopper and oven being shown in phantom.

The material transfer mechanism further comprises an abutment assembly 100, which is best shown in FIGS. 2, 3, 7, 8, and 10. The abutment assembly includes an angle iron 101 having a pair of flanges 102 and 103 directed normal to each other. There is provided a part-circular cutout 104 in the flange 103, the curvature of which substantially matches the curvature of the spout 36. Also, two stop plates 105 are respectively secured to the ends of the angle iron 101, each stop plate having an inclined abutment surface 106. The abutment assembly 100 is secured to the spout 36 which is positioned in the circular cutout 104. The inclination of the surface 106 is selected to match the inclination of the sides of the plate 82, so that, when the line about which each plate 82 is symmetrically arranged is disposed generally vertically, as shown in FIG. 2, the lefthand edge of the plate 82 will strike or engage the abutment surface 106. The plate 82 on the far side of the spout 36 will, of course, strike the other stop plate 105.

The material transfer mechanism further comprises a chute assembly 110 which includes an inner telescoping section 120, the construction of which is best seen in FIGS. 8 through 10. The inner telescoping section 120 is actually a sleeve having the wall thereof cut out to match the shape of the bottom wall 81 of the chute carrier 80. The inner diameter of the inner telescoping section 120 is selected to match the diameter of the opening 81a in the bottom wall 81 of the chute carrier 80. The telescoping section 120 is secured to the bottom wall 81 as shown. As is best seen in FIG. 10, the diameter of the hopper spout 36 is slightly larger, the upper surface of the bottom wall 81 serving to guide material from the spout 36 into the opening 81a and thence through the inner telescoping section 120.

Figure 3:
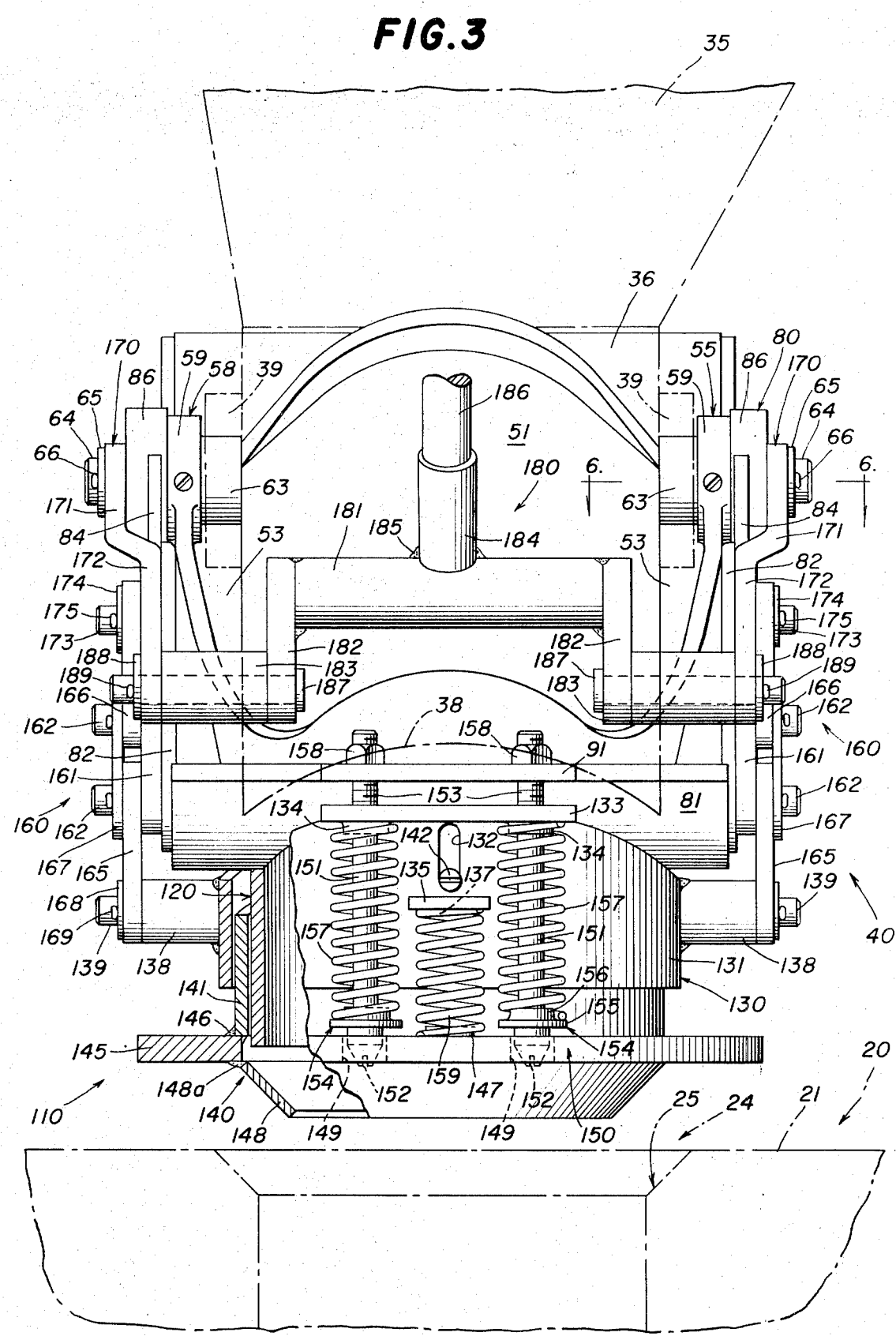
FIG. 3 is a front elevational view of the material transfer mechanism shown in FIG. 2.

The chute assembly 110 further comprises an outer telescoping section 130, the details of which are best seen in FIGS. 2 and 3. The outer telescoping section 130 includes a sleeve 131 having the upper surface thereof, as viewed in FIGS. 2 and 3, cut out at 131a to conform to the shape of the lower surface of the bottom wall 81 of the chute carrier 80. There is formed a slot 132 in the section 130, which slot is disposed generally vertically in use. A pair of flanges 133 is secured by welding, as at 133a, to the outer telescoping section 130 at diametrically opposed points thereon, which flanges are in alignment with each other and disposed normal to the axis of the sleeve 131. Provided on the underside of each of the flanges 133 is a pair of laterally spaced-apart bosses 134. There is also provided a pair of flanges 135 secured, as by welding 136, to the outside surface of the outer telescoping section 130 at a point approximately intermediate to the height of section 130. The flanges are in alignment with each other and disposed normal to the axis of the sleeve 131. Each flange 135 has a length about one third of the length of each of the flanges 133 and located laterally centrally with respect thereto. The under surface of each flange 135 also carries a downwardly projecting boss 137. Finally, the outer telescoping section 130 carries outwardly projecting cylindrical bodies 138 disposed at diametrically opposite points on the circumference 90° removed from the flanges 135. The axes of the bodies 138 are in alignment and disposed normal to the axis of the sleeve 131. Each body 138, in turn, carries an outwardly projecting stud 139.

The chute assembly 110 finally includes an intermediate telescoping section 140 which has a cylindrical sleeve 141. A threaded stud 142 engages in a suitably formed opening adjacent to the top of the sleeve 141, which stud 142 is arranged in position with respect to the rest of the parts of the chute assembly 110 to protrude through the slot 132 in the sleeve 131. As is best seen in FIG. 3, the lower surface of the stud 142 engages the bottom of the slot 132. The sleeve 141 carries at the lower end thereof a ring-like flange 145 welded as at 146. At diametrically opposite points on the upper surface of the flange 145 are two bosses 147 which are so arranged respectively vertically to align with the bosses 137. Formed in the flange 145 are four holes 149 being respectively aligned with the bosses 134 on the flanges 133. Finally, the intermediate telescoping section 140 includes a flange 148 which has a frustroconical shape and is welded at 148a to the underside of the ring flange 145. The slope or inclination of the flange 148 is selected to match the slope or inclination of the flared exterior portion 25 of the inlet 24 in the oven 20.

There is also provided a set of four spring assemblies 150, each spring assembly 150 including a bolt 151 having at one end thereof a slotted head 152 and having at the other end a thread 153. Each spring assembly 150 includes a spring seat 134 having a central opening therethrough which is greater in diameter than the diameter of the bolt 151 but less than the diameter of the head 152, whereby the spring seat 134 may rest on the head 152 as shown. The spring seat 134 includes a washer 155 of a relatively large diameter with a boss 156 of smaller diameter approximately equal to the diameter of each of the bosses 134 on the flange 133. There is also provided a spring 157 carried by the shoulder 155 of the spring seat 154, so that the boss 156 extends into one end thereof. The other end of the spring 157 receives the associated boss 134. Each bolt 151 passes through the associated boss 134 and through the flange 133, through the flange 91, and engages a nut 158. The head 152 is positioned in the associated hole 149 in the flange 145. With each of the four spring assemblies 150 thus arranged, the springs 157, which are in compression, draw the flanges 133 up and toward the associated flanges 91, whereby the outer telescoping section 130 is resiliently held in its retracted condition, that is, at its highest position relative to the chute carrier 80. Since the bottom of the slot 132 engages the stud 142, the intermediate telescoping section 140 is also in its retracted condition, that is, at its highest position relative to the chute carrier 80.

There is also provided a spring 159 on each side of the chute assembly 110, each spring 159 being disposed between the flange 145 and an associated one of the flanges 135, opposite ends of the spring respectively receiving associated bosses 137 and 147. When the outer telescoping section 130 is moved downwardly against the action of the springs 157, the flange 135 carried thereby also moves downwardly. This downward movement is transmitted via the springs 159 to the flange 145 which thereby causes the intermediate telescoping section 140 to move downwardly until the flange 145 engages the top 21 of the oven 20, and the flange 148 fits into the exterior flared portion 25 of the inlet 24. The springs 159 gently seal the flange 145 against the top 21. When the outer telescoping section 130 is lifted or retracted, it lifts or retracts the intermediate telescoping section 140 by virtue of the stud 142 engaging the bottom of the slot 132.

The material transfer mechanism 40 comprises a linkage mechanism 160 which includes a substantially T-shaped link 161, the link 161 carrying a pair of spaced-apart studs 162 adjacent to the ends of the shorter arm of the link 161. At the end of the longer arm of the link 161 is a hole through which passes the stud 87 carried by the plate 82. A washer 163 and a cotter pin 164, passing through a suitably formed transverse opening in the stud 87, operatively connect the link 161 to the plate 82. There is also provided a first elongated link 165 having holes in the ends thereof, one hole receiving therethrough the stud 162 and the other hole receiving the stud 139 on the sleeve 131. A washer 168 on the stud 139 and a cotter pin 169 operatively connect the link 165 to the outer telescoping section 130. A second elongated link 166 also has holes in the ends thereof, one of the holes receiving therethrough the other stud 162 on the T-shaped link 161. A third elongated link 167 has holes in the ends thereof respectively receiving therethrough the studs 162 on the T-shaped link 161. A pair of cotter pins 167a pass through suitably-formed holes in the studs 162 so as operatively to interconnect the links 161, 165 and 166.

The linkage mechanism 160 also includes a driver link 170 having a first portion 171 and a second portion 172 which is inwardly offset with respect to the portion 171. The portion 172 carries an outwardly directed stud 173 which passes through the remaining opening in the elongated link 166. A washer 174 and a cotter pin 175, passing through a suitably formed hole in the stud 173 operatively interconnect the links 166 and 170. As is best seen in FIG. 6, there is provided a hole in the free end of the portion 171 of the link 170, which receives therethrough the pivot pin 64. It is to be understood that the linkage mechanism 160 includes duplicate elements on each side of the material transfer mechanism 40. Thus, there is another set of links 161, 165, 166, and 170 interconnected in a similar fashion on the other side of the material transfer mechanism 40.

Finally, the material transfer mechanism 40 includes a driver unit 180, the driver unit 180 including a laterally extending pipe 181, a pair of flanges 182 being welded respectively to the ends of the pipe 181. A pair of headed pins 187 extends outwardly through suitably formed holes in the free ends of the flanges 182, the pins 187 respectively passing through bushings 183 and through openings in the outer ends of the portions 172 of the links 170. A washer 188 and a cotter pin 189 on each of the pins 187 operatively interconnect the driver unit 180 with the links 170. Welded at 184a approximately centrally on the pipe 181 is an outwardly directed cylindrical body 184 which in turn carries a rod 186 welded at 185. The rod 186 is connected to a motor (not shown) which can be hydraulic, pneumatic, electro-mechanical, etc.

Turning now to FIGS. 11, 12, and 13, the manner in which the material transfer mechanism 40 operates will be described. First, considering FIG. 11, the material transfer mechanism 40 is shown with the chute assembly 110 pivoted to the storage position thereof and the telescoping sections 120, 130, and 140 in their retracted condition. Also, the gate 50 is in the closed position thereof, that is, the drive mechanism to which the rod 75 is connected has moved the gate 50 to its maximum counterclockwise position, so that the arch-shaped wall 54 engages the spout 36 as shown. The closure wall 51 is immediately beneath the spout 36, so that material is retained in the hopper 35 therein. Also, the chute carrier 80 and the chute assembly 110 carried thereby have been pivoted to their maximum counterclockwise position, so that the chute assembly 110 is in a storage position, that is, it is not in alignment with the spout of the hopper 35 and the inlet 24 of the oven 20. The telescoping sections 120, 130, and 140 are in the retracted condition thereof. With the chute carrier 80 and the chute assembly 110 thus arranged, the link 170 is directed upwardly at an angle of about 45° and the axes of the links 165 and 166 are disposed generally parallel to each other. As previously explained, the telescoping sections 120, 130, and 140 are held retracted, by virtue of the action of the four springs 157 which draw the outer telescoping section 130 against the bottom wall 81 of the chute carrier 80 (by virtue of the complimentary shapes of the cutout 131a and the bottom wall 81). Because the outer telescoping section 130 is operatively connected to the intermediate telescoping section 140 by virtue of the stud 142, the intermediate telescoping section 140 is also held up toward the chute carrier 80 against the action of the springs 159.

When it is desired to charge the oven 20 with coal from the hopper 35, the chute carrier 80 and the chute assembly 110 carried thereby are pivoted into the discharge position thereof as follows. The motor to which the rod 186 is connected is operated to pivot the link 170 in the clockwise direction, as viewed in FIGS. 11, 12, and 13, to the position shown in FIG. 12 wherein the link 170 is at about 115°. It should be noted that the orientation of the links 161, 165, 166, and 167 has not changed appreciably from the position shown in FIG. 11. This is due to the fact that the four springs 157 hold the telescoping sections 120, 130, and 140 in the retracted condition thereof, thereby effectively preventing relative movement of the studs 139 with respect to the studs 87 which, in turn, prevents relative movement of the associated links 161 and 165 with respect to each other. The motor to which the rod 186 is connected will continue to pivot the link 170 and the chute carrier 80 until the lefthand (as viewed in FIG. 12) edges of the plates 82 respectively engage the abutment surfaces 106 of the stop plates 105. When such engagement occurs, the surfaces 106 are disposed generally vertically and the chute assembly 110 is in the discharge position thereof, that is, it is in alignment with the outlet of the hopper 35 and with the inlet 24 of the oven 20.

Since the stud 87 is now fixed, that is, it cannot move any farther in the clockwise direction, further operation of the motor attached to the rod 186 will transmit force via the links 166, 161, and 165 to the studs 139 on the outer telescoping section 130. Such movement causes the outer telescoping section 130 to move away from the chute carrier 80, that is, downwardly against the action of the springs 157. The flanges 135 transmit this downward movement via the spring 159 to the intermediate telescoping section 140 so as to move that section away from the chute carrier 80, that is, downwardly also. The telescoping sections 130 and 140 will continue to move downwardly until the flange 145 engages the top surface of the top wall 21 of the oven 20, whereupon the flange 148 will be disposed within the flared exterior portion 25 of the inlet 24 of the oven 20. The springs 159 serve resiliently and gently to hold the flange 145 against the oven 20. Now the telescoping sections 120, 130, and 140 are in the extended position thereof, as is shown in FIG. 13. To prevent the link 165 from being forced too far over center, there is provided a stop 88, the adjacent side of the link 165 engaging the abutment surface 90, thereby to prevent further movement of the various links. It is to be noted that when the telescoping sections 120, 130, and 140 are in the extended condition thereof, the link 170 is at an angle of about 135° and the axes of the links 165 and 166 are no longer parallel to each other.

Now that the chute carrier 80 and the chute assembly 110 are in the discharge position thereof and the telescoping sections 120, 130, and 140 are in the extended condition thereof, the gate 50 may be opened. This is accomplished by operating the motor to which the rod 75 is connected to pivot the gate 50 in the clockwise direction until the opening 52 is aligned with the spout 36 on the hopper 35. Then the material in the hopper 35 will gravitate through the spout 36, through the material transfer mechanism 40 into the inlet 24 of the oven 20 and into the oven 20.

To close the gate 50 and retract the telescoping sections 120, 130, and 140 and to move the chute carrier 80 and the chute assembly 110 carried thereby back to the storage position thereof, the reverse procedure is performed. Specifically, the gate 50 is first closed. This is accomplished by operating the motor to which the rod 75 is connected to pivot the gate 50 in a counterclockwise direction until the portion of the closure wall 51 without the opening 52 therein is aligned with the spout 36 on the hopper 35. This will, of course, prevent material in the hopper 35 from gravitating out of the spout 36. Next, the telescoping sections 120, 130, and 140 are retracted. This is effected by operating the motor to which the rod 186 is connected, to pivot the link 170 in a counterclockwise direction, as viewed in FIGS. 11, 12, and 13. Since the downward force on the link 165 is removed, the springs 159 move the telescoping section 130 upwardly until the cutout portion 131a engages the bottom surface of the bottom wall 81. Because the bottom of the slot 132 engages the stud 142, the intermediate telescoping section 140 is carried upwardly by the upward movement of the outer telescoping section 130, thereby to place the telescoping sections 120, 130, and 140 in their retracted condition. The longitudinal axes of the links 165 and 166 will then be substantially parallel, as shown in FIG. 12. Continuing the pulling stroke of the rod 186 to pivot the link 170 counterclockwise, pivots the chute carrier 80 and the chute assembly 110 carried thereby to the position shown in FIG. 11, thereby placing the chute assembly 110 in its storage position.

It should be noted that a single stroke of the rod 186 in one direction effects movement of the chute carrier 80 and the chute assembly 110 to the discharge position thereof and also causes the telescoping sections 120, 130, and 140 to become extended. Similarly, a single stroke in the reverse direction of the rod 186 retracts the telescoping sections 120, 130, and 140 and then pivots the chute carrier 80 and the chute assembly 110 carried thereby to the storage position thereof. An advantage of this construction is that a single source of drive can be used to accomplish two actions, namely: the swinging into alignment and nonalignment of the chute assembly 110; and, secondly, the extending and retracting of the telescoping sections 120, 130, and 140.

A particular advantage of the device which has been described is that a portion of the telescoping sections, the flange 145, actually seals against the oven 20, and another portion, the flange 148, enters the inlet 24 of the oven 20. Thus, pollutants, flames and fumes from the oven 20 are not discharged into the atmosphere. Also, it is insured that all of the material leaving the hopper 35 will be delivered to the oven 20 and none will be left on the region of the oven 20 surrounding the inlet 24.

A further advantage is achieved primarily due to the springs 159 to minimize the chances of damage to the top 21 of the oven 20. The springs 159 assure that the intermediate telescoping section 140 does not simply drop, but rather, gently, although forceably, seats on the oven 20. This is particularly important in that the top 21 is usually constructed of brick and highly susceptible to damage. Also, the inlet 24 is often an iron casting and is susceptible to damage.

A further advantage of the material transfer mechanism 40 above described is its ability to swing out of the way and thereby enable special charging car 30 which carries the mechanism 40 to move onto the next set of inlets and/or next oven. Also, there is usually associated with the oven 20 an automatic cover plate mechanism which covers the inlets 24. The ability of the material transfer mechanism 40 to swing to the storage position thereof enables the cover plates to be set in place.

It is believed that the invention, its mode of construction and operation, and many of its advantages should be readily understood from the foregoing without further description, and it should also be manifest that, while a preferred embodiment of the invention has been shown and described for illustrative purposes, the structural details are, nevertheless, capable of wide variations within the purview of the invention as defined in the appended claims.

What is claimed is:

1. A material transfer mechanism for transferring material from a source thereof to a utilization means for the material, said material transfer mechanism comprising a chute movably mounted adjacent to the outlet of the source and movable between discharge and storage positions, said chute in the discharge position thereof being aligned with the outlet of the source and the inlet of the utilization means, said chute in the storage position thereof being out of alignment with the outlet of the source and the inlet of the utilization means, said chute including at least two telescoping sections movable with respect to each other between retracted and extended conditions, one of said telescoping sections in the extended condition thereof being resiliently urged against the utilization means, and an actuating mechanism coupled to said chute and operable to move said chute to the discharge position thereof followed by placing said telescoping sections in the extended condition thereof, said actuating mechanism being operable to place said telescoping sections in the retracted condition thereof followed by moving said chute to the storage position thereof.

2. The material transfer mechanism set forth in claim 1, wherein said chute is pivotally mounted and is pivotal between the discharge and storage positions thereof.

3. The material transfer mechanism set forth in claim 1, wherein said chute includes an entering member and a sealing member, said entering member in the extended position of said chute entering the inlet of the utilization means, said sealing member in the extended position of said chute engaging the surface on the utilization means adjacent to the inlet.

4. The material transfer mechanism set forth in claim 1, wherein said telescoping sections are concentric cylinders.

5. The material transfer mechanism set forth in claim 1, wherein said chute is pivotally mounted and is pivotal on the order of about at least 60° between the discharge storage positions thereof.

6. A material transfer mechanism for transferring material from a source thereof to a utilization means for the material, said material transfer mechanism comprising a gate movably mounted adjacent to the outlet of the source of material and movable between open and closed positions with respect to the outlet, a chute movably mounted adjacent to the outlet of the source and movable between discharge and storage positions, said chute in the discharge position thereof being aligned with the outlet of the source and the inlet of the utilization means, said chute in the storage position thereof being out of alignment with the outlet of the source and the inlet of the utilization means, said chute including at least two telescoping sections movable with respect to each other between retracted and extended conditions, one of said telescoping sections in the extended conditions thereof being resiliently urged against the utilization means, and an actuating mechanism coupled to said chute and operable to move said chute to the discharge position thereof followed by placing said telescoping sections in the extended condition thereof, said actuating mechanism being operable to place said telescoping sections in the retracted condition thereof followed by moving said chute to the storage position thereof.

7. The material transfer mechanism set forth in claim 6, wherein said gate is pivotally mounted and is pivotal between the open and closed positions thereof.

8. The material transfer mechanism set forth in claim 6, wherein said gate is pivotally mounted about a fixed point and pivotal between the open and closed positions thereof, said chute being pivotally mounted about said fixed point and pivotal between the discharge and storage positions thereof.

9. The material transfer mechanism set forth in claim 6, wherein said gate includes a part-cylindrical bottom wall and a pair of side walls on the sides thereof and extending upwardly therefrom, said bottom wall having an opening therein, means pivotally mounting said side walls on the opposite sides of a spout protruding from the hopper, said gate being in the open position thereof when said opening is aligned with the outlet of the spout and being in the closed position thereof when the bottom wall is pivoted so that the opening is not aligned with the outlet of the spout.

10. A material transfer mechanism for transferring material from a source thereof to a utilization means for the material, said material transfer mechanism comprising a chute including a chute carrier and a chute assembly fixedly mounted thereon, said chute carrier being pivotally mounted adjacent to the outlet of the source to enable said chute to be pivotal between discharge and storage positions, said chute assembly in the discharge position of said chute being aligned with the outlet of the source and the inlet of the utilization means, said chute assembly in the storage position of said chute being out of alignment with the outlet of the source and the inlet of the utilization means, said chute including at least two telescoping sections movable with respect to each other between retracted and extended conditions, one of said telescoping sections in the extended condition thereof being resiliently urged against the utilization means, and an actuating mechanism coupled to said chute and operable to move said chute to the discharge position thereof followed by placing said telescoping sections in the extended condition thereof, said actuating mechanism being operable to place said telescoping sections in the retracted condition thereof followed by moving said chute to the storage position thereof.

11. The material transfer mechanism set forth in claim 10, and further comprising a stop in the path of said chute carrier and arranged to be struck thereby in the discharge position of said chute.

12. The material transfer mechanism set forth in claim 10, wherein one of said telescoping sections is fixedly secured to said chute carrier.

13. A material transfer mechanism for transferring material from a source thereof to a utilization means for the material, said material transfer mechanism comprising a chute movably mounted adjacent to the outlet of the source and movable between discharge and storage positions, said chute in the discharge position thereof being aligned with the outlet of the source and the inlet of the utilization means, said chute in the storage position thereof being out of alignment with the outlet of the source and the inlet of the utilization means, a stop in the path of said chute and arranged to be engaged thereby in the discharge position thereof, said chute including at least two telescoping sections movable with respect to each other between retracted and extended conditions, spring means coupled to said telescoping sections for resiliently holding said sections in the retracted condition thereof, a linkage coupled to said chute for transmitting force thereto, the application to said linkage of force in one direction first moving said chute to the discharge position thereof into engagement with said stop and then overcoming said spring means to place said telescoping sections in the extended condition thereof, the application to said linkage of force in the opposite direction permitting said telescoping sections to spring back to the retracted condition thereof followed by moving said chute to the storage position thereof.

14. A material transfer mechanism for transferring material from a source thereof to a utilization means for the material, said material transfer mechanism comprising a chute movably mounted adjacent to the outlet of the source and movable between discharge and storage positions, said chute in the discharge position thereof being aligned with the outlet of the source and the inlet of the utilization means, said chute in the storage position thereof being out of alignment with the outlet of the source and the inlet of the utilization means, said chute including at least two telescoping sections movable with respect to each other between retracted and extended conditions, spring means coupled to said telescoping sections for resiliently holding said sections in the retracted condition thereof, a linkage including at least two links coupled together and respectively coupled to said telescoping sections, means coupled to the juncture of said links for transmitting force thereto for moving said chute, the application to said linkage of force in one direction first moving said chute to the discharge position thereof and then overcoming said spring means to place said telescoping sections in the extended condition thereof, the application to said linkage of force in the opposite direction permitting said telescoping sections to spring to the retracted condition thereof and followed by moving said chute to the storage position thereof.

15. The material transfer mechanism set forth in claim 14, wherein one of said links is coupled at three separate points thereon respectively to said other link and to said first telescoping section and to said force-transmitting means.

16. The material transfer mechanism set forth in claim 14, wherein said telescoping sections are concentric cylinders.

17. A material transfer mechanism for transferring material from a source thereof to a utilization means for the material, said material transfer mechanism comprising a chute movably mounted adjacent to the outlet of the source and movable between discharge and storage positions, said chute in the discharge position thereof being aligned with the outlet of the source and the inlet of the utilization means, said chute in the storage position thereof being out of alignment with the outlet of the source and the inlet of the utilization means, said chute including first and second and third telescoping sections movable with respect to one another between retracted and extended conditions, spring means coupled to said first and second telescoping sections for resiliently holding said first and second telescoping sections in the retracted condition thereof, means operatively connecting together said second and third telescoping sections, a linkage including at least two links coupled together and respectively coupled to said first and second telescoping sections, means coupled to the juncture of said links for transmitting force thereto for moving said chute, the application to said linkage of force in one direction first moving said chute to the discharge position thereof and then overcoming said spring means to cause said second telescoping section to move away from said first telescoping section and carry said third telescoping section away from said first telescoping section and thus place said telescoping sections in the extended condition thereof, the application to said linkage of force in the opposite direction permitting said second telescoping sections to spring toward said first telescoping section and carry said third telescoping section toward said first telescoping section and thus place said telescoping sections in the retracted condition thereof and followed by moving said chute to the storage position thereof.

18. The material transfer mechanism set forth in claim 17, wherein said connecting means includes spring means coupled between said second and third telescoping sections to enable said third telescoping section to follow said second telescoping section as said chute is placed in the extended condition thereof.

19. The material transfer mechanism set forth in claim 17, wherein said first telescoping section is the innermost of said telescoping sections, said second telescoping section is the outermost of said telescoping sections, and said third telescoping section is intermediate said first and second telescoping sections.

20. A material transfer mechanism for transferring material from a source thereof to a utilization means for the material, said material transfer mechanism comprising a chute movably mounted adjacent to the outlet of the source and movable between discharge and storage positions, said chute in the discharge position thereof being aligned with the outlet of the source and the inlet of the utilization means, said chute in the storage position thereof being out of alignment with the outlet of the source and the inlet of the utilization means, said chute including first and second and third telescoping sections movable with respect to one another between retracted and extended conditions, first spring means coupled to said first and second telescoping sections for resiliently holding said first and second telescoping sections in the retracted condition thereof, means operatively connecting together said second and third telescoping sections, a sealing flange on the outer end of said third telescoping section and adapted to engage the area around the inlet of the utilization means when said chute is in the extended condition thereof, an entry member on the outer end of said third telescoping section and having dimensions to enter the inlet of the utilization means when said chute is in the extended condition thereof, second spring means interconnecting said second and third telescoping sections to cause said third telescoping section to follow said second telescoping section when the latter is extended, a linkage including at least two links coupled together and respectively coupled to said first and second telescoping sections, means coupled to the juncture of said links for transmitting force thereto for moving said chute, the application to said linkage of force in one direction first moving said chute to the discharge position thereof and then overcoming said first spring means to cause said second telescoping section to move away from said first telescoping section, said second telescoping section carrying said third telescoping section away from said first telescoping section to cause said flange resiliently to engage the area of the utilization means around the inlet thereof and to cause the entry member to enter the inlet, the application to said linkage of force in the opposite direction permitting said second telescoping section to spring toward said first telescoping section and carry said third telescoping section toward said first telescoping section and thus place said telescoping sections in the retracted condition thereof and followed by moving said chute to the storage position thereof.

21. The material transfer mechanism set forth in claim 20, wherein said entry member has a frustroconical shape having its smaller diameter at the outer end thereof and being constructed to match the shape of the inlet to the utilization means.

22. A material transfer mechanism for transferring material from a source thereof to a utilization means for the material, said material transfer mechanism comprising a chute including a chute carrier and a chute assembly fixedly mounted thereon, said chute carrier being pivotally mounted adjacent to the outlet of the source to enable said chute to be pivotal between discharge and storage positions, said chute assembly in the discharge position of said chute being aligned with the outlet of the source and the inlet of the utilization means, said chute assembly in the storage position of said chute being out of alignment with the outlet of the source and the inlet of the utilization means, a stop in the path of said chute carrier and arranged to be engaged thereby in the discharge position thereof, said chute assembly including first and second and third telescoping sections movable with respect to one another between retracted and extended conditions, said first telescoping section being fixedly secured to said chute carrier, spring means coupled to said first and second telescoping sections for resiliently holding said first and second telescoping sections in the retracted condition thereof, means operatively connecting together said second and third telescoping sections, a linkage including at least first and second links coupled together and respectively coupled to said chute carrier and to said second telescoping section, means coupled to the juncture of said links for transmitting force thereto for moving said chute, the application to said linkage of force in one direction first moving said chute to the discharge position thereof and then overcoming said spring means to cause said second telescoping section to move away from said first telescoping section and carry said third telescoping section away from said first telescoping section and thus place said telescoping sections in the extended condition thereof, the application to said linkage of force in the opposite direction permitting said second telescoping sections to spring toward said first telescoping section and carry said third telescoping section toward said first telescoping section and thus place said telescoping sections in the retracted condition thereof and followed by moving said chute to the storage position thereof.

23. The material transfer mechanism set forth in claim 22, wherein said first telescoping section is the innermost of said telescoping sections, said second telescoping section is the outermost of said telescoping sections, and said third telescoping section is intermediate said first and second telescoping sections.

24. The material transfer mechanism set forth in claim 22, and further comprising a stop on said chute carrier and arranged to be engaged by said first link just prior to said telescoping sections being extended.

25. A material transfer mechanism for transferring material from a source thereof to a utilization means for the material, said material transfer mechanism comprising a chute including a chute carrier and a chute assembly fixedly mounted thereon, said chute carrier being pivotally mounted adjacent to the outlet of the source to enable said chute to be pivotal between discharge and storage positions, said chute assembly in the discharge position of said chute being aligned with the outlet of the source and the inlet of the utilization means, said chute assembly in the storage position of said chute being out of alignment with the outlet of the source and the inlet of the utilization means, said chute assembly including a first telescoping section fixedly secured to said chute carrier and a second telescoping section movable with respect to said first telescoping section between retracted and extended conditions, said chute assembly including spring means coupled to said telescoping sections for resiliently holding said sections in the retracted condition thereof, a linkage including first and second and third links, said first link being coupled to said second telescoping section, said second link being coupled to said chute carrier and to said first link, said third link being pivotally mounted and operatively connected to said second link at one point on said third link, means coupled to a second point on said third link for transmitting force thereto, the application to said third link of force in one direction first pivoting said chute to the discharge position thereof and then overcoming said spring means to place said telescoping sections in the extended condition thereof, the application to said third link of force in the opposite direction permitting said telescoping sections to spring back to the retracted condition thereof and followed by moving said chute to the storage position thereof.

26. The material transfer mechanism set forth in claim 25, wherein said second link is coupled at one point thereon to said chute carrier and at a second different point to said first link and at a third different point thereon to said third link.

27. The material transfer mechanism set forth in claim 26, and further comprising a fourth link coupled between said third link and the third point on said second link.

28. The material transfer mechanism set forth in claim 25, wherein the first telescoping section is the innermost of said telescoping sections and said second telescoping section is the outermost of said telescoping sections.

29. A material transfer mechanism for transferring material from a source thereof to a utilization means for the material, said material transfer mechanism comprising a chute including a chute carrier and a chute assembly fixedly mounted thereon, said chute carrier including a bottom wall with an opening therein and a pair of upstanding side walls thereon, said side walls being pivotally mounted on opposite sides of a spout protruding from the outlet of the source to enable said chute to be pivotal between discharge and storage positions, said chute assembly in the discharge position of said chute being aligned with the spout and the inlet of the utilization means, said chute assembly in the storage position of said chute being out of alignment with the spout and the inlet of the utilization means, said chute including first and second telescoping sections movable with respect to each other between retracted and extended conditions, said first telescoping section being fixedly secured to the bottom wall of said chute carrier in line with said opening thereon, spring means coupled to said telescoping sections for resiliently holding said sections in the retracted condition thereof, a pair of linkages respectively coupled to opposite sides of said chute and each including first and second and third links, said first link being coupled to said second telescoping section on the associated side thereof, said second link being coupled to the associated first link and to said chute carrier on the associated side thereof, said third link being pivotally mounted adjacent to the associated side of the spout and operatively connected to the associated second link at one point on said third link, means coupled to a second point on said third link for transmitting force thereto, the application to said third link of force in one direction first pivoting said chute to the discharge position thereof and then overcoming said spring means to place the telescoping sections in the extended condition thereof, the application to said third link of force in the opposite direction permitting said telescoping sections to spring back to the retracted condition thereof and then moving said chute to the storage position thereof.

30. A material transfer mechanism for transferring material from a source thereof to a utilization means for the material, said material transfer mechanism comprising a chute movably mounted adjacent to the outlet of the source and movable between discharge and storage positions, said chute in the discharge position thereof being aligned with the outlet of the source and the inlet of the utilization means, said chute in the storage position thereof being out of alignment with the outlet of the source and the inlet of the utilization means, said chute including at least two telescoping sections movable with respect to each other between retracted and extended conditions, and an actuating mechanism coupled to said chute and operable to move said chute to the discharge position thereof followed by placing said telescoping sections in the extended condition thereof, said actuating mechanism being operable to place said telescoping sections in the retracted condition thereof followed by moving said chute to the storage position thereof, said actuating mechanism including a single input for coupling to a single source of power for moving said chute between the discharge and storage positions thereof and moving said telescoping sections between the extended and retracted conditions thereof.

* * * * *